March 3, 1953
H. A. SCHURICHT
2,630,348
DRIVING PULLEY
Filed Nov. 19, 1946
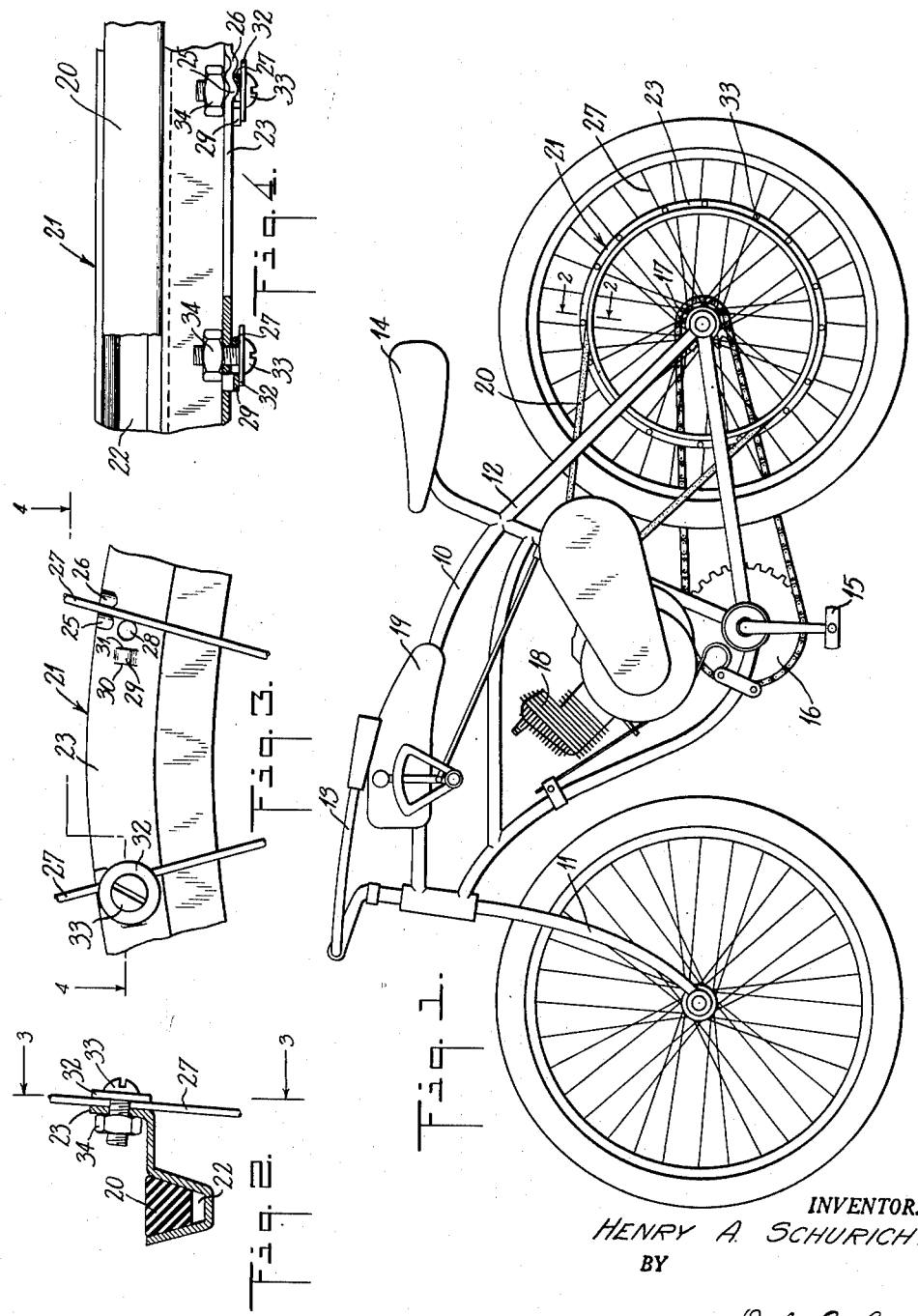
INVENTOR.
HENRY A. SCHURICHT
BY
Dale A. Bauer
ATTORNEY

Patented Mar. 3, 1953

2,630,348

UNITED STATES PATENT OFFICE

2,630,348

DRIVING PULLEY

Henry A. Schuricht, Maywood, Calif., assignor to Whizzer Motor Company, Inc., Pontiac, Mich., a corporation of Delaware Application November 19, 1946, Serial No. 710,855

10 Claims. (Cl. 301—6)

This invention relates to a driving pulley for a motor bicycle. Motor bicycles are ordinary bicycles to which a motor is added. The preferred method of mounting the motor is on the bicycle frame and the preferred method of driving the bicycle from the motor is through the rear wheel. Many connections and devices for that purpose have been devised because of the difficulty of properly assembling the simplest and most obvious device, a pulley mounted on the rear wheel.

Heretofore, several difficulties arose in connection with the use of a belt and pulley drive. Among them were these, that the pulley could not be mounted concentrically except with the greatest difficulty, so that in all ordinary installations there was sufficient eccentricity to give the bicycle a faintly uneven pace when under power, and the eccentricity of the pulley was increased by the pull of the belt; the pulley could be moved circularly on the spokes and could be pulled or knocked out of position; the retaining means by which the pulley was held on the spokes could be dislodged from some spokes because of poor fit or poor grip, weakening the structure and causing collapse under heavy load; and the pulley and its fastening devices became more complex as attempts were made to overcome its faults.

It is an object of this invention to make a pulley for attachment to the driving wheel of a bicycle that will be of simple construction, easy to attach to the bicycle wheel concentrically, able to withstand the use to which it is put and the loads and shocks applied without failure or displacement, and free from the need of adjustment when once applied. Another object is to attach a pulley to the spokes of a bicycle wheel by simple and superior means.

In the preferred embodiment of the invention the pulley is provided with means to position it upon the spokes and with simple but positive means to grip the spokes, the attaching means being spaced and constructed so that when all are attached the wheel and pulley will be centered.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for that latter purpose being had primarily to the appended claims.

In the drawings, wherein like reference characters refer to like parts throughout the several views, Fig. 1 is an elevational view of a bicycle with a pulley of the invention attached to the spokes of the rear wheel;

Fig. 2 is a section on line 2—2 of Fig. 1;

Fig. 3 is an enlarged detail of the attaching means; and

Fig. 4 is a section on broken line 4—4 of Fig. 3 with the right hand bolt in place.

In the drawing is shown a bicycle having frame 10, front fork 11, rear fork 12, handlebars 13, saddle 14, pedals 15, sprocket 16, and coaster brake 17. A gasoline motor 18 is mounted on the frame and a gasoline tank 19 is attached to the upper bar of the frame. A double belt drive, similar to that described in my copending application Serial No. 558,865, now Patent No. 2,560,991, is provided, the wedge belt 20 of the drive being shown in the drawing. The belt passes over the pulley 21 and propels the bicycle through it.

The pulley is a metal ring having a conformation suited to the efficient transmission of power from the belt, cord, or chain 20 used to drive it. In the illustrative example a wedge-shaped belt is used and a wedge-shaped groove 22 is provided in the pulley to receive it. The pull of the drive seats the wedge firmly in the groove and transmits the power without appreciable loss.

An annular flange 23 projects about the body of the pulley and is shaped to lie flat against the spokes of the wheel, consequently being faintly conical in conformation and avoiding the placing of strain on the spokes to which it is attached.

The pulley may be made by casting, pressing, spinning, stamping, or the like. It is preferably made by forming sheet metal to circular and transverse shape and welding the abutting ends of the circle. Thin gauge sheet may be used and butt welding employed, the exposed butts being ground or milled off smooth after the welding. Steel or aluminum, alone or alloyed, are satisfactory but are not exclusively useful. Aluminum or stainless steel are preferred. In one method of manufacture a sheet of aluminum is formed in the shape of a ring with a radially extending flange. From the body of the ring the flange 23 is then formed, and from the radial flange the groove 22 is spun. It will be understood that the several operations may be executed simultaneously or in different order.

The rim of the flange 23 is provided at spaced intervals with pairs of bumps 25, 26 which are formed in the edge by making dents in the opposite face of the flange. These bumps are about a quarter inch long and of height less than the diameter of a spoke. The bumps are arranged side by side in pairs so that a notch is provided between them for the reception of a wheel spoke 27. The bumps are preferably aligned as the wheel spoke is aligned, not radially but slightly off radially, as will be understood by wheelmakers, so that the spoke lies between them without distortion. The pairs of bumps are not equally spaced about the periphery but in alternating long and short lengths, in conformity to wheel spoke placement.

As a result of this construction the pulley is centered as soon as all the spokes lie in the notches, and centering apparatus of the type employed heretofore is unnecessary and undesirable. The pulley serves, consequently, not only as a power element, but as a support and brace for the wheel spokes.

Tangent to the lie of the spokes are holes 28, and across the holes from the spokes are projections 29 struck up from the flange 23 in any way found suitable. The way shown is by making slots 30, 31 and deforming the web between the slots into a small mound 29 having about the height of a spoke's thickness. A washer 32 is laid upon the mound and the spoke, and a bolt 33 is passed through the washer and the hole in the flange and is held in place by a nut 34. The washer lies flat upon the spoke and holds it in the notch between the bumps.

This simple structure does not work loose. The bolts and nuts are not loosened by vibration. The structure does not become eccentric nor require realignment. Bicycles have been driven tens of thousands of miles over rough country without loosening of these parts. The alignment of the notches is very important, serving, because of their slightly off-radial direction, for self-centering the pulley. The drawing shows no lock washers beneath the nuts because none are needed. The structure of the rear wheel is strengthened, not distorted and weakened, by the pulley.

As many apparently widely different embodiments of this invention may be made without departing from the spirit and scope thereof, it is to be understood that I do not limit myself to the specific embodiments thereof except as defined in the appended claims.

What is claimed is:

1. A pulley for a motor bicycle comprising a metal ring having a flange adapted to lie against the spokes of a bicycle wheel, bumps in said flange in pairs forming when the ring is centered spoke-aligned notches, headed attaching means in positions adjacent to the lie of the spokes, and protuberances serving to level the headed means.

2. A pulley for a motor bicycle comprising a metal ring having an annular flange adapted to lie flat against the spokes of a bicycle wheel, bumps in the rim of said flange in pairs forming when the ring is centered spoke-aligned notches of less depth than the thickness of a wire spoke, headed attaching means in positions adjacent to the lie of the spokes, and protuberances of spoke thickness in positions beneath the headed means opposite the spokes.

3. A pulley for a motor bicycle comprising a metal ring having an annular flange adapted to lie flat against the spokes of a bicycle wheel, bumps in the rim of said flange in pairs forming spoke-aligned notches of less depth than the thickness of a wire spoke, holes in the flange in positions tangent to the lie of the spokes in the notches, protuberances of spoke thickness in the flange across the holes from the spokes, washers of size sufficient to bear upon a spoke and a protuberance, and bolts penetrating washers and holes to assemble the ring and wheel.

4. A pulley for a motor bicycle comprising a metal ring having a flared annular groove adapted to receive a wedge-shaped drive belt and having an annular flange adapted to lie flat against the spokes of a bicycle wheel, aligning means comprising bumps in the rim of the said flange in pairs forming spoke-aligned notches of less depth than the thickness of a wire spoke, holes in the flange in positions tangent to the lie of the spokes in the notches, protuberances of spoke thickness in the flange across the holes from the spokes, washers of size sufficient to bear upon a spoke and a protuberance, and bolts penetrating washers and holes to assemble the ring and wheel.

5. In a machine of the class described, a part adapted for attachment to the spokes of a bicycle wheel, headed spoke attaching means, and a protuberance on said part adapted to bear the side of the head opposite the spoke.

6. A pulley, for a wheel with wire spokes, having a flange adapted to lie against the spokes of the wheel, bumps in pairs on said flange forming aligned notches adapted to encircle the wheel hub and to receive and lie in alignment with the spokes only when the pulley is centered on the wheel, and bolt and washer attaching means disposed in close proximity to said first-named means and extending over said notches and adapted to hold the spokes in the notches, and fulcrum means in the flange beneath the washers opposite the notches.

7. A pulley, for a wheel with wire spokes, having a flange adapted to lie against the spokes of the wheel, elongated bumps on said flange forming notches adapted to encircle the wheel hub and to lie in alignment with the spokes only when the pulley is centered on the wheel, lever headed attaching means disposed to one side of the notches and adapted to engage and hold the spokes in the notches, and fulcrum means in the flange beneath the headed means, and means to tighten the lever means against the fulcrums and spokes when the pulley is centered.

8. In a pulley structure adapted to be attached to the wire spokes of a wheel, a rim for accommodating a belt, a flange attached to the rim, said flange having a number of grooves adjacent the periphery of the flange, serving as seats for the spokes, and a plurality of headed fastening means passing through the flange, each fastening means engaging a spoke, said flange having a boss serving as a rest for the head of the fastening means, the corresponding spoke being disposed so that the fastening means passes between the boss and the spoke.

9. A pulley for a wire spoke wheel having a circular flange adapted to lie flat against the spokes, means to center the pulley on the wheels comprising pairs of protuberances in the flange having spacing and alignment that fits the spokes when the wheel and pulley are concentric, said flange having holes adjacent the spokes to provide for the reception of fastening means, and low projections in the flange on the opposite sides of the holes from the spokes whereby ordinary bolts and washers may be employed as fastening means in combination with said projections.

10. A pulley, for a wheel with wire spokes, having a flange adapted to lie against the spokes of the wheel, pulley centering means on said flange, and spoke fastening means in said flange comprising holes adjacent the positions of spokes in the centered position of the pulley, and small protuberances in the flange adjacent the holes.

HENRY A. SCHURICHT.

REFERENCES CITED

The following references are of record in the file of this patent:

UNITED STATES PATENTS

| Number | Name | Date |
|---|---|---|
| 718,094 | Clement | Jan. 13, 1903 |
| 1,062,905 | Gadd | May 27, 1913 |
| 1,186,224 | Murray | June 6, 1916 |
| 1,355,505 | Riise | Oct. 12, 1920 |
| 1,561,180 | Merkel | Nov. 10, 1925 |
| 1,618,074 | Flory | Feb. 15, 1927 |

FOREIGN PATENTS

| Number | Country | Date |
|---|---|---|
| 17,765 | Great Britain | 1901 |
| 21,738 | Great Britain | 1906 |
| 351,322 | France | May 3, 1905 |
| 565,010 | France | 1924 |